Jan. 26, 1954  R. K. SCHLOSSER, JR  2,667,239
ADJUSTING MECHANISM FOR RAILWAY BRAKE RIGGINGS
Filed Oct. 3, 1951
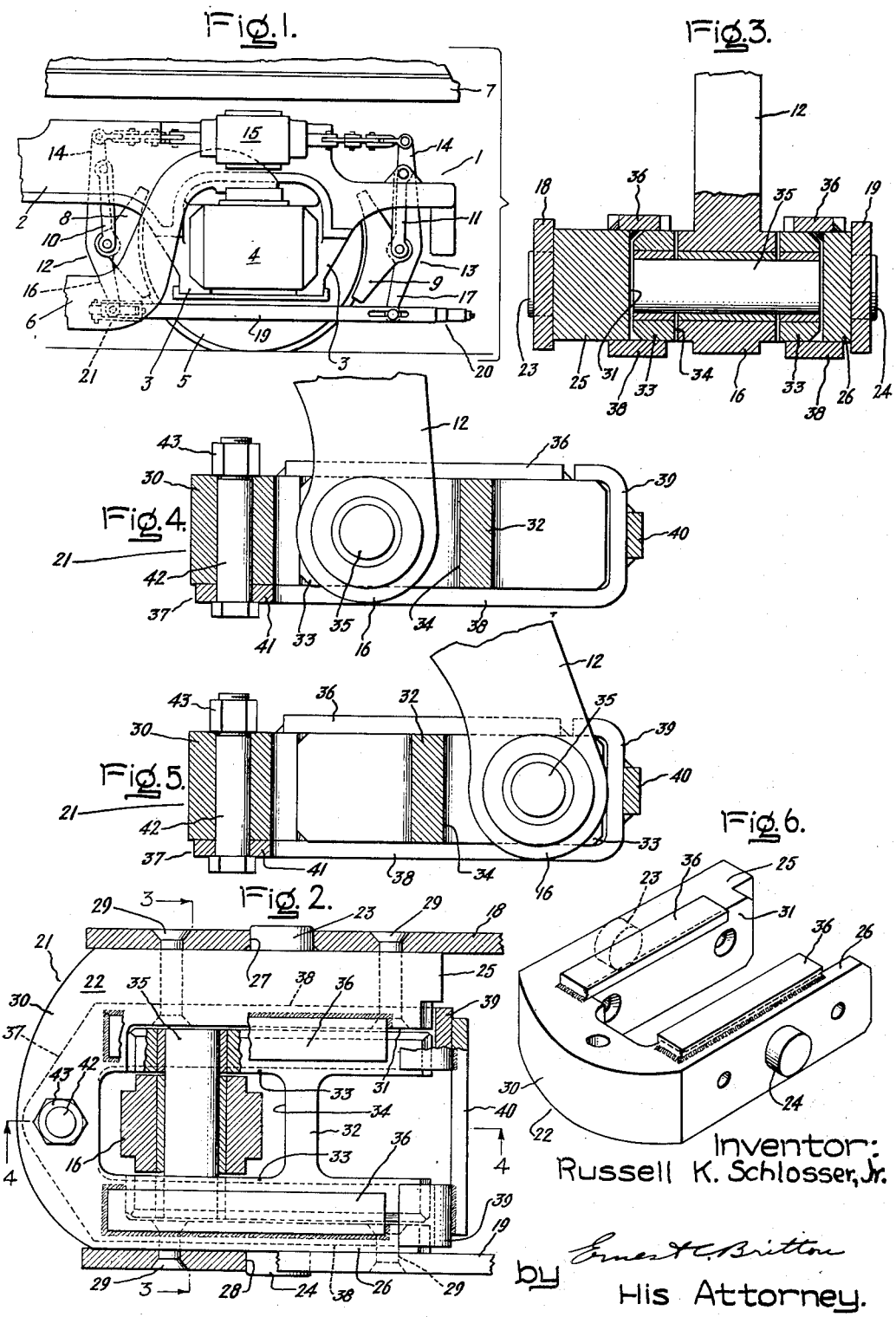
Inventor:
Russell K. Schlosser, Jr.
by Ernest H. Britton
His Attorney.

Patented Jan. 26, 1954

2,667,239

UNITED STATES PATENT OFFICE 2,667,239

ADJUSTING MECHANISM FOR RAILWAY BRAKE RIGGINGS

Russell K. Schlosser, Jr., Wesleyville, Pa., assignor to General Electric Company, a corporation of New York Application October 3, 1951, Serial No. 249,541

2 Claims. (Cl. 188—197)

This invention relates to adjusting mechanisms for brake rigging for rail vehicle trucks and, more particularly, to adjusting mechanisms for clasp brake rigging.

In the design of clasp type brake rigging, particularly of the type having truck levers arranged on either side of each wheel interconnected by pull rods straddling the wheels, it is common practice to provide adjustment in the length of the pull rods to compensate for wheel wear in addition to brake shoe wear. The ordinary brake shoe wear is conventionally compensated for by providing a slack adjuster which connects the pull rods to one of the truck levers and provision for wheel wear is made by providing a number of holes in the ends of the pull rods remote from the slack adjuster. As the wheels wear, compensation is then secured by removing the pin connecting the truck lever to the pull rods and moving the connection to the next hole, so that the truck lever and brake head and shoe is moved closer to the wheel. Quite often in the case of trucks having motorized axles, however, the proximity of the traction motor and the side equalizers provides insufficient room for either securing a pin or bolt in place or for the removal of such pin or bolt. It is, therefore, desirable in the design of brake rigging of this type to provide an arrangement which will permit adjustment of one of the truck levers with respect to the pull rods without requiring the insertion and removal of a pin or bolt.

An object of this invention is, therefore, to provide an improved brake rigging arrangement of the clasp type wherein one of the truck levers may be readily moved or adjusted with respect to the pull rods.

In accordance with one embodiment of this invention, a yoke member is provided having its arms permanently connected to the two pull rods. A connecting member is provided having the truck lever pivotally connected to one end thereof, and is arranged intermediate the arms of the yoke member in either a first position with the end connected to the truck lever facing away from the wheel or in a second position with the end facing toward the wheel. A retainer is provided for holding the connecting member in the space between the yoke member arms in either the first or second position. Thus, the retainer can be removed, its connection with the yoke member being by means of a vertical bolt, and the connecting member shifted from its first position into its second position without disconnecting the truck lever. The retainer is then reassembled with the result that the truck lever has been shifted with respect to the pull rods to compensate for wheel wear.

Further objects and advantages of this invention will become apparent by reference to the following description and the accompanying drawing, and the features of novelty which characterize this invention will be pointed out with particularity in the claims annexed to and forming a part of this specification.

In the drawing, Fig. 1 is a side elevational view illustrating the clasp brake rigging in which this invention is utilized; Fig. 2 is a plan view, partly in section, illustrating the improved wheel wear compensating means of this invention; Fig. 3 is a fragmentary cross-sectional view taken along the line 3—3 of Fig. 2; Fig. 4 is a side view, partly in section, taken along the line 4—4 of Fig. 2 and illustrating the connecting member and truck lever in one position; Fig. 5 is another side view, partly in section, illustrating the connecting member and the truck lever in the other position; and Fig. 6 is a view in perspective of the yoke member of the assembly.

Referring now to Fig. 1, there is shown a rail vehicle truck, generally identified as 1, having a side frame 2 with bearing pedestals 3 depending therefrom. Journal box 4 of the axle supporting wheel 5 is mounted for vertical movement between the pedestals 3 and, with side equalizers 6, connects journal box 4 to the other journal box of the truck and to the spring system. The truck 1 is connected to body 7 by a suitable center bearing (not shown). A pair of brake heads and shoes 8 and 9 are arranged on either side of the wheel 5 and are pivotally supported by means of brake hanger levers 10 and 11. Live truck levers 12 and 13 are also pivotally connected to the brake heads and shoes 8 and 9, and their upper extremities 14 are connected through suitable links and levers (not shown) for operation by power cylinder 15 on the side frame 2. The lower extremities 16 and 17 of the truck levers 12 and 13 are interconnected by pull rods 18 and 19 straddling the wheel 5, the connection between the pull rods and the truck lever 13 being through slack adjuster 20. The connection between the pull rods 18 and 19 and the truck lever 12 is through the improved adjusting means 21 to be hereinafter more fully described. While a free floating brake rigging is shown utilizing two live truck levers, the improved adjusting means of this invention is equally applicable to any other form of clasp brake rigging having brake shoes and heads on either side of a wheel, and thus it will be readily apparent that either truck lever 12 or truck lever 13 may be a dead lever rather than a live lever as shown.

Referring now to Figs. 2 to 6 inclusive, a yoke member 22 is provided having bosses 23 and 24 formed on the external surfaces of arms 25 and 26 respectively. The bosses 23 and 24 engage holes 27 and 28 in pull rods 18 and 19, and rivets 29 serve to permanently attach the arms 25 and 26 of yoke 22 to the pull rods 18 and 19. It will be readily apparent that the arms 25 and 26 of yoke 22 could be permanently connected to the pull rods 18 and 19 in any other suitable manner, as by welding. It will also be readily apparent by inspecting Fig. 2 that no part extends substantially beyond the inner pull rod 18 to interfere with the traction motor or an equalizer. The arms 25 and 26 of the yoke member 22 are interconnected by bridging portion 30 and thus define an open-ended recess 31 which faces toward the wheel 5.

In order to connect the truck lever 12 to the yoke member 22, a connecting member 32 is provided having a pair of spaced-apart arms 33 defining a recess 34. The end 16 of the truck lever 12 is arranged in the recess 34 and is pivotally connected to the arms 33 by means of a headless pin 35. The recess 34 of the connecting member 32 is adjacent one end thereof, so that the connection between the truck lever 12 and the connecting member 32 is also at one end. Thus, the connecting member 32 may be arranged in the recess 31 with the yoke 22 in one position, as shown in Fig. 4, with the recess 34 facing away from the wheel 5, and in a second position as shown in Fig. 5 with the recess 34 facing toward the wheel 5. A pair of retainers 36 are connected to the upper surfaces of the arms 25 and 26 of the yoke 22, and serve to retain the connecting member 32 in the recess 31 and the connecting member 32 is also retained in position by a retaining member 37, having a pair of arms 38 extending under the connecting member 32, with hook portions 39 engaging the ends thereof. It will be seen that a member 40 serves to connect the hook portions 39 to provide necessary strength and rigidity and a bridging portion 41 connects the arms 38 and is removably secured to the bridging portion 30 of the yoke 22 in any suitable manner, as by bolt 42.

It will now be readily seen that the retainer 37 may be removed by unscrewing the nut 43 from the vertical bolt 42, which is positioned on top of the bridging portion 30 of the yoke member 22. After removal of the retaining member 37, the connecting member 32 may be reversed end for end from the position shown in Fig. 4 to the position shown in Fig. 5, by pivoting it about pin 35. Thus, the connecting member 32 may be reversed without removing the pin 35, so that the connecting member 32 is at all times connected to the truck lever 12. After reversal of the connecting member 32 to the position shown in Fig. 5, the retaining member 37 may be again reassembled by the bolt 42 and nut 43, thus locking the connecting member in place. It will be readily seen that reversal of the connecting member 32 from the position shown in Fig. 4 to the position shown in Fig. 5 relocates the truck lever 12 relative to the pull rods 18 and 19 and the wheel 5, giving the same effect as changing the location of the pin through the pull rods. It will also be noted that when the connecting member 32 is in either its first or its second positions, the pin 35 through the arms 33 and the end 16 of the truck lever 12 is retained in position by the arms 25 and 26 of the yoke 22. Retainers 36 support the yoke 22 and the pull rods 18 and 19 on the connecting member 32, and the retainer 37 prevents the connecting member 32, which is in an unbalanced position about the pin 35, from assuming some unnatural position when the brakes are released.

It will now be readily seen that this improved construction permits ready adjustment of the truck levers for wheel wear, without the necessity for removing bolts or pins transversely of the pull rods. Thus, the pull rods may be arranged immediately adjacent the traction motor since the only part which needs removal is the bolt 42, which is vertically arranged through the bridging portion 30 of the yoke 22. This arrangement also permits dropping of the pull rods 18 and 19 to remove a wheel without requiring lowering of the traction motors.

While I have shown and described a particular embodiment of this invention, further modifications and improvements will occur to those skilled in the art. I desire it to be understood, therefore, that this invention is not limited to the form specifically shown, and I intend in the appended claims to cover all modifications which do not depart from the spirit and scope of this invention.

What I claim as new and desire to secure by Letters Patent of the United States is:

1. An adjusting mechanism for a rail vehicle truck brake rigging having a truck lever and including a pair of pull rods straddling a wheel of the truck, comprising means for connecting the truck lever to the pull rods including a yoke member having arms respectively connected to the pull rods, a connecting member having the truck lever pivotally connected to one end thereof, said connecting member being arranged intermediate said yoke member arms and being movable from a first position in which the said end to which the truck lever is connected faces away from the wheel to a second position with said end facing toward the wheel whereby the truck lever can be moved closer to the wheel to compensate for wheel wear, and means removably secured to said yoke member for retaining said connecting member in either said first or said second position.

2. An adjusting mechanism for a rail vehicle truck brake rigging having a truck lever and including a pair of pull rods straddling a wheel of the truck, comprising means for connecting the truck lever to the pull rods including a yoke member having arms respectively connected to the pull rods, a connecting member having a pair of arms defining a recess at one end thereof, the truck lever being arranged in said connecting member recess and pivotally connected to the said connecting member arms, said connecting member being arranged intermediate said yoke member arms and being movable from a first position in which said recess in which the truck lever is connected faces away from the wheel to a second position with said recess facing toward the wheel whereby the truck lever can be moved closer to the wheel to compensate for wheel wear, and means removably secured to said yoke member for retaining said connecting member in either said first or said second position.

RUSSELL K. SCHLOSSER, Jr.

References Cited in the file of this patent

UNITED STATES PATENTS

| Number | Name | Date |
|---|---|---|
| 1,969,159 | Simanek | Aug. 7, 1934 |
| 2,104,787 | Blomberg | Jan. 11, 1938 |
| 2,145,578 | Baselt | Jan. 31, 1939 |
| 2,425,979 | Bachman | Aug. 19, 1947 |